United States Patent [19]

Kim et al.

[11] Patent Number: 5,486,485
[45] Date of Patent: Jan. 23, 1996

[54] METHOD OF MANUFACTURING A REFLECTIVE DISPLAY

[75] Inventors: Manjin J. Kim, Ossining; Satyendranath Mukherjee, Yorktown Heights, both of N.Y.

[73] Assignee: Philip Electronics North America Corporation, New York, N.Y.

[21] Appl. No.: 198,243

[22] Filed: Feb. 18, 1994

[51] Int. Cl.⁶ .................................................. H01L 21/84
[52] U.S. Cl. .................... 437/41; 437/50; 359/57; 359/59
[58] Field of Search ......................... 437/21, 41, 101, 437/909, 50–51; 359/57, 59

[56] References Cited

U.S. PATENT DOCUMENTS 5,091,334  2/1992  Yamazaki et al. ................. 437/101
5,247,289  9/1993  Matsueda ............................. 345/98
5,251,049  10/1993  Sato et al. ........................... 359/40
5,327,268  7/1994  Takabatake et al. ................ 359/59
5,359,441  10/1994  Mori et al. .......................... 359/51

*Primary Examiner*—Olik Chaudhuri
*Assistant Examiner*—Richard A. Booth
*Attorney, Agent, or Firm*—Paul R. Miller

[57] ABSTRACT

A method is set forth for forming a plurality of SOI transistors in a pattern beneath planarized reflective surfaces of a reflective display. This enables the formation of information pixels useful in devices, such as reflective LCD devices. A specific technique of providing the SOI transistors is set forth.

7 Claims, 3 Drawing Sheets

METHOD OF MANUFACTURING A REFLECTIVE DISPLAY

The present invention is directed to a method of manufacturing a reflective display of the type used in liquid crystal displays (LCD). In particular, the method of the present invention makes information pixels for use in such reflective displays where a silicon-on-insulator (SOI) type of thin film transistor (TFT) is provided beneath the reflective surface of the pixel.

BACKGROUND OF THE INVENTION

In flat panel displays, such as the flat panel projection TV system, a transparent substrate, such as quartz or glass plates have been used to fabricate TFT active matrices. The area occupied by the TFT, a storage capacitor, and a metal conductor of the pixel significantly reduces the transmission ratio of the display. In addition light losses are caused by absorption of the substrate, indium tin oxide (ITO) electrodes and the liquid crystal material itself.

In the reflective mode of a LCD panel, there is a great flexibility of matrix array layout for pixels without any restriction on type of substrate. The major problem that occurs in manufacturing such displays is planarization of the substrate to form a good reflective surface.

An example of such planarization in a reflective LCD panel may be seen in Japanese Reference No. 55-32026(A) in which a field effect transistor (FET) is formed on a silicon substrate and covered with flattening layers of a varnish-type insulation. This flattening layer prevents serration where vapor deposition films do not deposit during the subsequent formation of transparent conductive film layers and orientation films for the liquid crystal.

Also in U.S. Pat. No. 4,205,425, a planar liquid crystal matrix array structure is made by using a smoothing layer of appropriate materials. Such smoothing material is identified as a polyimide and subsequent reflective electrodes are formed thereover.

A major concern in constructing reflective LCD panels involves the elimination of leakage currents in the TFT induced by light entering the structure between reflective electrodes of the pixel areas. The present invention obviates this problem by constructing a SOI type of transistor beneath the reflective electrode in such a manner that leakage currents from the transistor are prevented.

SUMMARY OF THE INVENTION

The presently claimed invention achieves this goal in a reflective display of the active matrix type having a plurality of pixels controlling the display. In particular, the present invention forms a plurality of SOI transistors in a pattern on a substrate and then forms a planarized reflective metal surface over each of the SOI transistors to provide a plurality of reflective information pixels.

This is achieved in the present invention by first forming a layer of $SiO_2$, forming a pattern of thin films of silicon on the layer of $SiO_2$, masking a first part of each thin film of silicon in the pattern, oxidizing a second remaining part of each thin film of silicon in the pattern, removing the masks and forming a gate structure on a portion of each first part of the thin film of silicon and forming source and drain structures relative to other separate first parts of the thin film of silicon.

The formation of a planarized reflective metal surface over each of the SOI transistors occurs by forming of a planarizing material over at least the plurality of SOI transistors, separating the planarizing material at areas away from the plurality of SOI transistors to form a plurality of pixel areas, and depositing reflective metal on separated planarized material to form the plurality of reflective pixels.

Further, before forming the structure of planarizing material, metal lines are formed in grooves between oxidized remaining parts in the pattern and further metal lines are formed in contact with the source, drain and gate structures in each of the SOI transistors. Also, a storage capacitor is formed in each pixel area before carrying out the steps of forming the layer of planarizing material.

Finally, in order to help reduce light reflection from the boundaries of the pixels, anti-reflective film, such as polysilicon, may be deposited between each of the reflective pixel structures to prevent reflected light from degrading the image resolution. This can eliminate a light shield mask on the counter electrode that reduces the aperture ratio by consuming a large area in the boundary.

The construction of the SOI transistor is carried out with a thin film of silicon having a thickness ranging between 0.5 and 2.0 microns. The layer of $SiO_2$ on which the thin film of silicon is formed, is provided to a thickness of about 2 microns. Upon selectively oxidizing the inactive parts of the thin film of silicon, a $SiO_2$ layer is formed having a field oxide thickness ranging between 3–6 microns. This dielectric isolation prevents leakage currents from occurring because of light penetrating through pixel boundaries in order to greatly help form a high quality image.

These aspects of forming a plurality of SOI transistors in a pattern on a substrate may be used in a method of manufacturing reflective liquid crystal displays in which following the formation of a plurality of pixels on a first substrate with reflective electrode structures, where each of the pixels is controlled by an SOI transistor beneath the reflective electrode surfaces, a transmissive second substrate having a continuous transmissive electrode surface and a liquid crystal layer are provided between the reflective electrode surfaces and the continuous electrode surface.

Further, in the subsequent construction of a LCD display with a reflective active matrix arrangement, the thickness of a layer of planarizing material, such as polyimide, may be about 2 microns, while a reflective metal surface of aluminum, for example, may be about 1 micron in thickness. The liquid crystal material between the continuous counter electrode and the reflective electrodes might be of a thickness of about 1 micron and the depth of the liquid crystal material between the reflective surfaces of the active matrix may be about 3 microns.

BRIEF DESCRIPTION OF THE DRAWING FIGURES

The invention will be described in detail, by way of example, with reference to the drawing figures. Therein:

FIGS. 1, 2, 3, 4 and 5 set forth various steps of forming SOI devices in an active matrix display;

DESCRIPTION OF THE PREFERRED EMBODIMENTS

Figure 1:
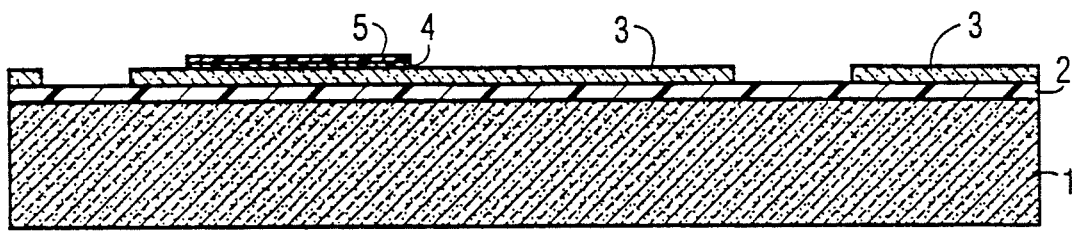

Similar reference numerals are used to identify corresponding parts of respective drawing figures. Moreover, in order to aid and clarify the description, various thicknesses are not shown to scale.

Figure 2:
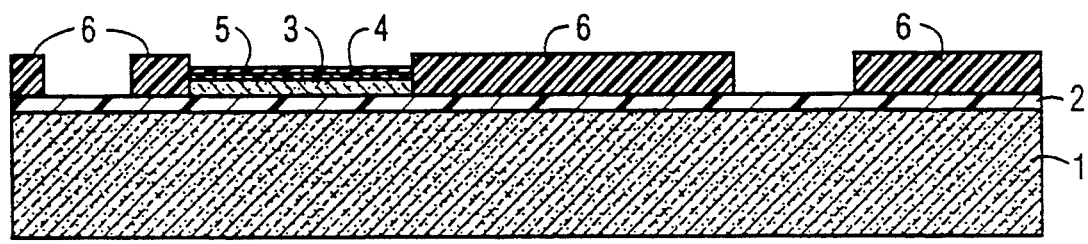

The construction of the SOI transistorized reflective pixel is shown in sequence relative to FIGS. 1–5. In this respect, FIG. 1 shows the provision of a $SiO_2$ layer 2 on a silicon substrate 1. For the SOI starting material, $SiO_2$ layer 2 may be at a thickness of about 2 microns, and a thin silicon film 3 having a thickness ranging between 0.5 microns and 2 microns is prepared on the silicon oxide layer 2 in a pattern. A portion of the thin film silicon layer 3 is grown as a $SiO_2$ pad 4 and a $Si_3N_4$ nitride layer 5 for LOCOS oxidation. The nitride layer 5 acts as a mask during oxidation in which, as shown in FIG. 2, the unmasked thin film silicon layer 3 is oxidized by LOCOS oxidation to form a $SiO_2$ field oxide layer 6.

Figure 3:
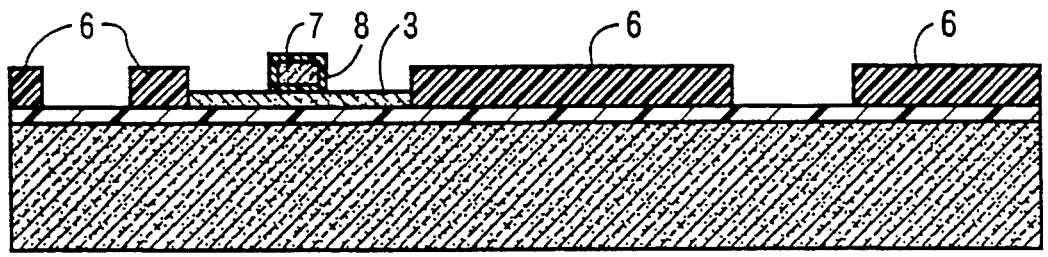

As seen in FIG. 3, following removal of the $SiO_2$-$Si_3N_4$ mask 4, 5, a clean gate oxide 8 is grown and a gate 7 of polysilicon is deposited, patterned and capped with a protective oxide. Then uncovered portions of the gate oxide 8 are removed from the thin film silicon layer 3.

Thereafter, a metal layer, such as aluminum, is formed over the surface of the structure in FIG. 3. This metal layer is then patterned so that metal lines 9 are left in the source and drain areas of the SOI transistor, and metal lines 9' and 9" are left in grooves between the $SiO_2$ field oxide portions 6. The carrying out of the technique in this manner minimizes extra steps in the creation of the metal lines.

Figure 4:
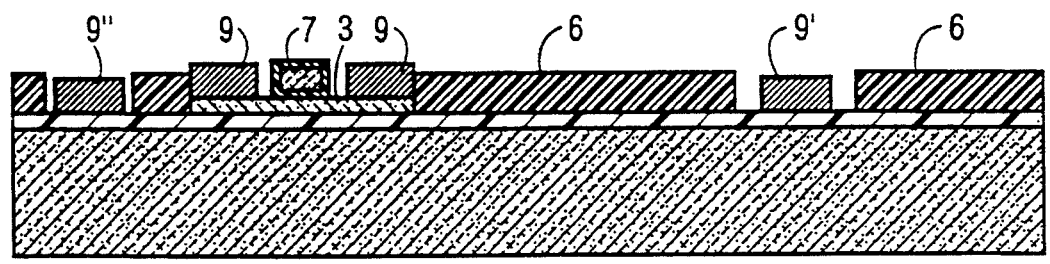
Figure 5:
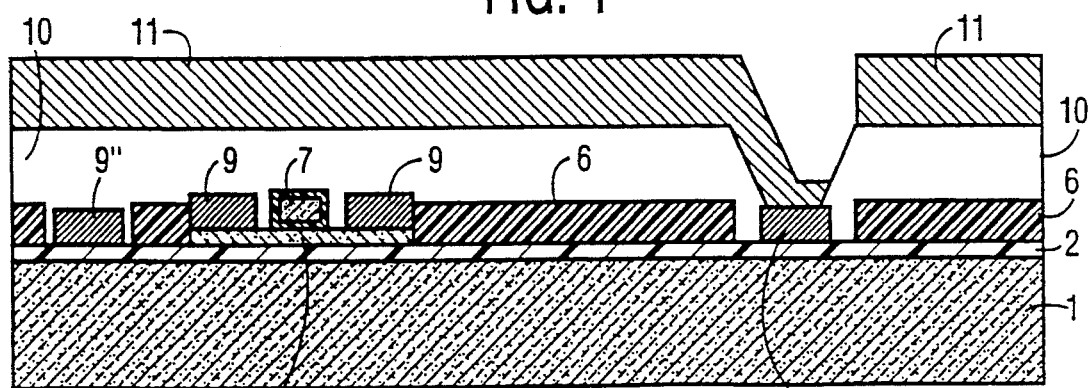

Finally, in FIG. 5, polyimide 10 is formed over the surface of FIG. 4 to form a planarized structure surface. This may be achieved by providing multi layers of polyimide. This planarized layer is etched at portions over the metallized line 9' to expose this metal line. Thereafter, a second metal of a material, such as aluminum, is deposited on the planarized surface to make the reflective portions of the reflective pixels. At the sloped etch portions of the polyimide, the second metallized layer 11 contacts the active device through the metal line 9'.

Figure 6:
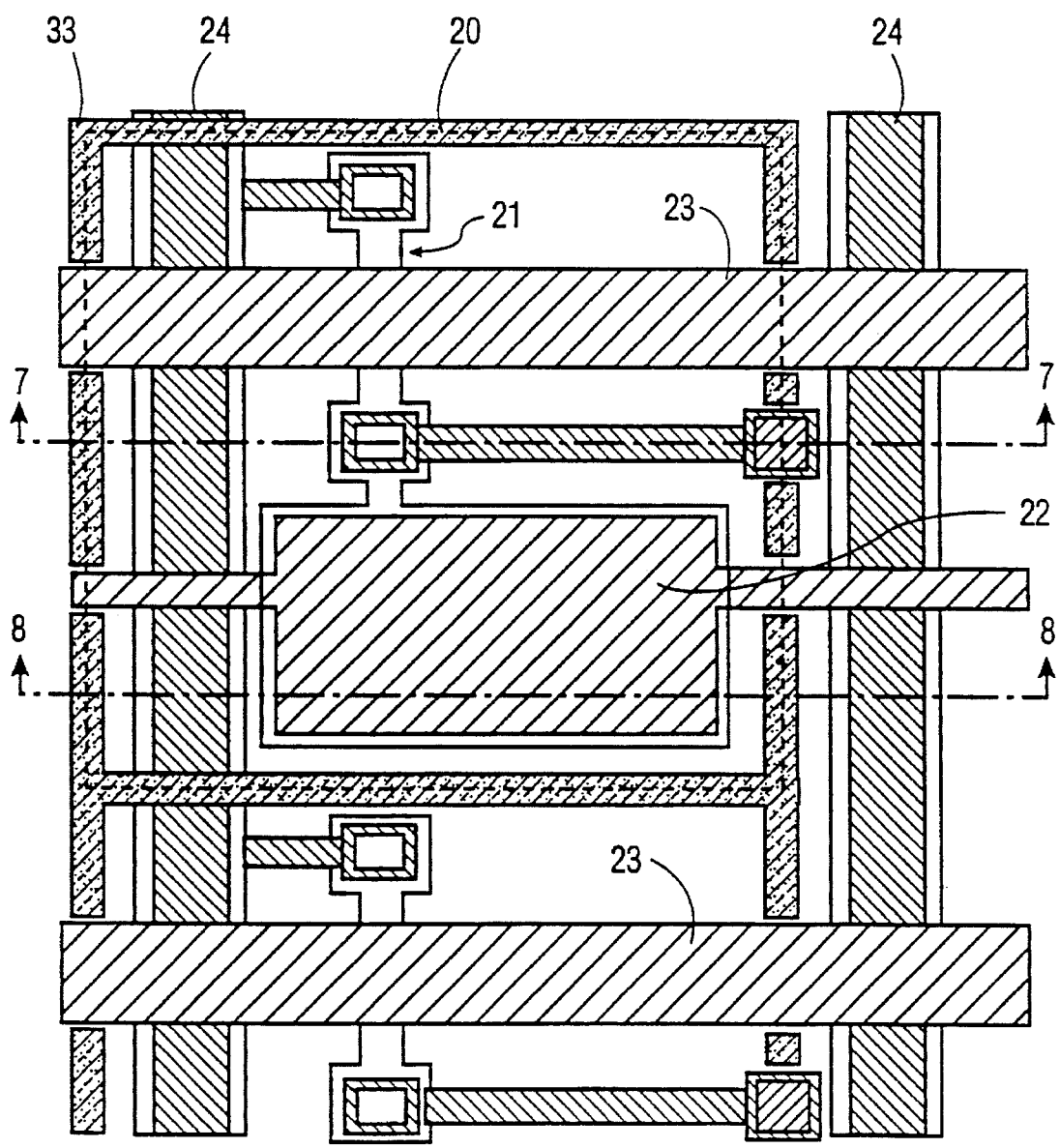
FIG. 6 shows an example of a pixel according to the present invention.

FIG. 6 shows a top view of a schematic layout for a pixel 20 shown in rectangular dotted lines. In this pixel, a storage capacitor 22 can be laid out below the reflective surface 11 of the pixel. The active device of the pixel, i.e. the SOI thin film transistor, is located at the area 21. The row 23 and column 24 electrode lines of the active matrix display are shown in FIG. 6 relative to the pixel 20. An anti-reflective film 33, such as a polysilicon film, for example, is deposited in a groove formed along the pixel boundary through the polyimide planarized layer.

By burying all the active and passive components under the reflective metal of the pixel, there is no size restriction so that the storage capacitor 22 can be made as large as desired, as long as an excess crosstalk with the reflective metal electrodes does not hinder performance. The storage capacitor 22 can be made large to improve image quality and also connected to an independent ground plate instead of an adjacent gate line. This will drastically increase signal propagation speed along gate lines. The storage capacitor can also be made with a double polysilicon layer so that there is no need for a highly conductive gate, such as the metal gate used for a prior art type single panel TFT array.

Figure 7:
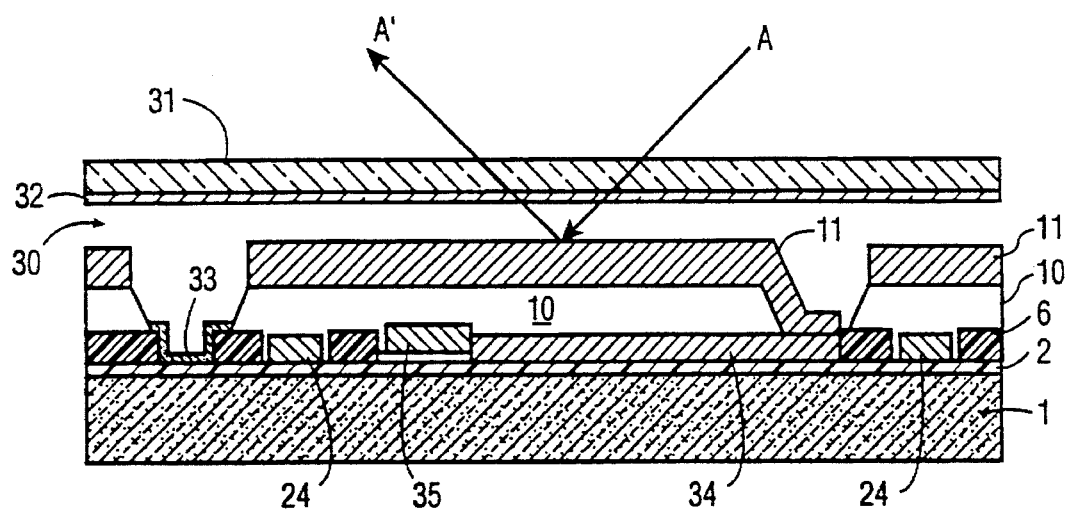
FIG. 7 shows a cross-sectional view of a LCD device through this pixel along the line 7—7 in FIG. 6.

FIG. 7 shows a LCD device in cross section along the line 7—7 in FIG. 6. In this arrangement, light is directed in the direction A through the glass counter electrode substrate 31 of a LCD device through the conductive continuous transmissive electrode 32 of an ITO electrode through the liquid crystal layer 30 and reflected from the reflective pixel electrode 11 in the direction A'. The thicknesses of the respective layers may be, for example, 2 microns for the planarizing layer 10, 1 micron for the metallizing layer 11, and 1 micron for the liquid crystal layer 30.

The LCD thickness in the pixel boundary between the planarizing layers 10, the reflecting layers 11, and the LCD layer 30 will be about 4 microns which is too thick to respond to single panel HDTV operation so that the gap between reflective electrodes of the respective pixels may be sufficiently deep to make the gap appear dark. Therefore, there is no need for a dark mask or shielding mask on the counter electrode 32. This means it is not necessary for the counter electrode 32 to be aligned to the substrate, which is a significant improvement for this construction.

Furthermore, reflection from the gap may be small because of the absence of reflective metal. However, any reflection from the gap can be further reduced by coating an anit-reflective layer 33, such as polysilicon, in the gaps. This anti-reflective material also reduces the need for dark masks on the counter electrode 31.

Connection from the reflective layer 11 to the active device is made through the conductive line 34 to the contact 35 for the active device, i.e. the SOI transistor.

Figure 8:
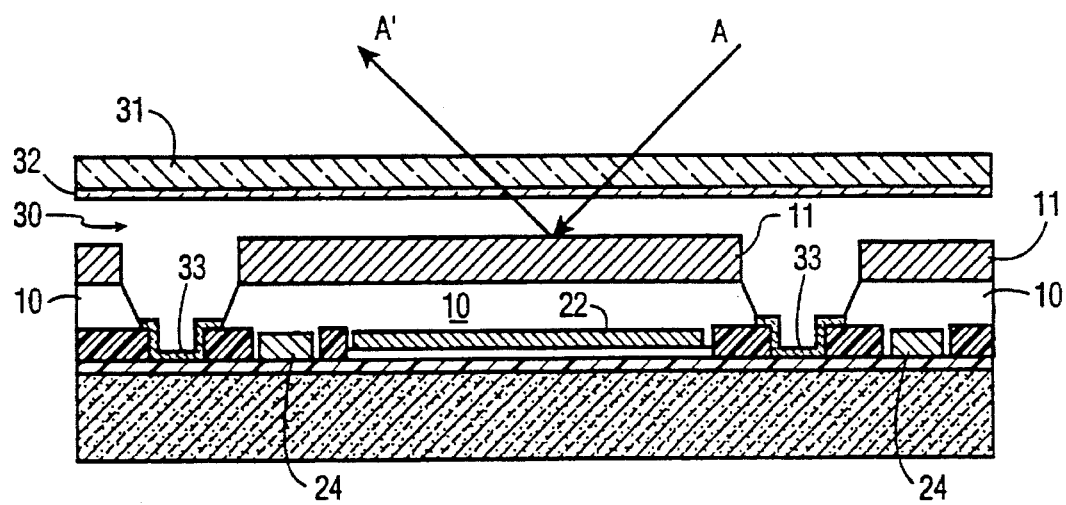
FIG. 8 shows a cross-section of the LCD device and the structure of the pixel along line 8—8 in FIG. 6.

FIG. 8 shows a similar arrangement to FIG. 7, but along the line 8—8 of FIG. 6. In this manner, the storage capacitor 22 is seen in the pixel structure beneath the reflective layer 11.

What we claim:

1. A method of making a plurality of information pixels for a reflective display comprising the steps of:

(a) forming a layer of SiO2 on a silicon substrate, (b) forming a plurality of SOI thin film transistors on said layer of SiO2, (c) forming a storage capacitor adjacent to each of said plurality of SOI thin film transistors, (d) forming a plurality of metal lines in contact with each of said SOI thin film transistors and each of said storage capacitors, (e) covering each of said SOI thin film transistors and each of said storage capacitors with a thickness of a planarized layer of polyimide, (f) separating said planarized layer of polyimide covering each SOI thin film transistor and each storage capacitor into individual areas having a covering of said polyimide layer, and (g) covering each individual planarized layer of polyimide with a thickness of a reflective metal electrode to form a plurality of individual pixels.

2. A method according to claim 1, wherein anti-reflective boundaries are formed between said plurality of individual pixels.

3. A method according to claim 1, wherein said planarizing polyimide layer has a thickness of about 2 microns and said reflective metal layer has a thickness of about 1 micron so that there is a boundary depth of the thicknesses of each planarizing polyimide layer and each overlying reflective metal layer between each of said plurality of individual pixels.

4. A method according to claim 1, wherein said thickness of said planarized polyimide layer is formed by depositing multilayers of polyimide until a total thickness is formed with a planar surface.

5. A method of manufacturing a reflective liquid crystal display comprising the steps of:
   (a) forming a plurality of reflective information pixels comprising the processing steps of:
      (i) forming a layer of $SiO_2$ on a silicon substrate;
      (ii) forming a plurality of SOI thin film transistors on said layer of $SiO_2$;
      (iii) forming a storage capacitor adjacent to each of said plurality of SOI thin film transistors;
      (iv) forming a plurality of metal lines in contact with each of said SOI thin film transistors and each of said storage capacitors;
      (v) covering each of said SOI thin film transistors and each of said storage capacitors with a thickness of a planarized layer of polyimide;
      (vi) separating said planarized layer of polyimide covering each SOI thin film transistor and each storage capacitor into individual areas having a covering of said polyimide layer; and
      (vii) covering each individual planarized layer of polyimide with a thickness of a reflective metal electrode to form a plurality of individual pixels;
   (b) forming a transmissive second substrate having a transmissive electrode surface; and
   (c) providing a twisted pneumatic liquid crystal layer between said plurality of reflective individual information pixels and said transmissive electrode surface.

6. A method according to claim 5, wherein a boundary depth of about 3 microns is formed between each of said plurality of reflective individual information pixels and said liquid crystal layer has a thickness of only about 1 micron so that the thickness of said liquid crystal layer between each of said plurality of pixels is sufficient to make the gaps between reflective electrodes to appear dark.

7. A method according to claim 5, wherein anti-reflective boundaries are formed between said plurality of individual pixels.

* * * * *